(12) United States Patent
Vashchenko et al.

(10) Patent No.: US 8,284,530 B1
(45) Date of Patent: Oct. 9, 2012

(54) ELECTROSTATIC DISCHARGE (ESD) PROTECTION CIRCUIT AND RELATED APPARATUS AND METHOD

(75) Inventors: Vladislav Vashchenko, Palo Alto, CA (US); James Di Sarro, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 331 days.

(21) Appl. No.: 12/551,140

(22) Filed: Aug. 31, 2009

(51) Int. Cl.
*H02H 9/04* (2006.01)

(52) U.S. Cl. ........................................................ 361/56

(58) Field of Classification Search ...................... 361/56
See application file for complete search history.

(56) References Cited

U.S. PATENT DOCUMENTS

| | | | |
|---|---|---|---|
| 5,400,202 A * | 3/1995 | Metz et al. ............... | 361/56 |
| 6,433,368 B1 | 8/2002 | Vashchenko et al. | |
| 6,560,081 B1 | 5/2003 | Vashchenko et al. | |
| 6,690,069 B1 | 2/2004 | Vashchenko et al. | |
| 6,717,219 B1 | 4/2004 | Vashchenko et al. | |
| 6,720,624 B1 | 4/2004 | Vashchenko et al. | |
| 6,784,029 B1 | 8/2004 | Vashchenko et al. | |
| 6,815,732 B1 | 11/2004 | Vashchenko et al. | |
| 6,822,294 B1 | 11/2004 | Vashchenko et al. | |
| 6,841,829 B1 | 1/2005 | Vashchenko et al. | |
| 6,911,679 B1 | 6/2005 | Vashchenko et al. | |
| 6,919,588 B1 | 7/2005 | Vashchenko et al. | |
| 6,933,588 B1 | 8/2005 | Vashchenko et al. | |
| 6,946,690 B1 | 9/2005 | Vashchenko et al. | |
| 6,970,335 B1 | 11/2005 | Vashchenko et al. | |
| 7,023,029 B1 | 4/2006 | Vashchenko et al. | |
| 7,027,277 B1 | 4/2006 | Vashchenko et al. | |
| 7,027,278 B1 | 4/2006 | Vashchenko et al. | |
| 7,050,314 B1 | 5/2006 | Vashchenko et al. | |
| 7,057,215 B1 | 6/2006 | Vashchenko et al. | |
| 7,064,397 B1 | 6/2006 | Vashchenko et al. | |
| 7,115,951 B1 | 10/2006 | Vashchenko et al. | |
| 7,126,168 B1 | 10/2006 | Vashchenko et al. | |
| 7,141,831 B1 | 11/2006 | Vashchenko et al. | |
| 7,145,187 B1 | 12/2006 | Vashchenko et al. | |
| 7,193,251 B1 | 3/2007 | Vashchenko et al. | |
| 7,217,966 B1 | 5/2007 | Vashchenko et al. | |
| 7,221,036 B1 | 5/2007 | Vashchenko et al. | |

(Continued)

OTHER PUBLICATIONS

James Di Sarro, et al., "A Dual-Base Triggered SCR with Very Low Leakage Current and Adjustable Trigger Voltage", EOS/ESD Symposium 2008, 7 pages.

(Continued)

*Primary Examiner* — Jared Fureman
*Assistant Examiner* — Nicholas Ieva
(74) *Attorney, Agent, or Firm* — Alan A. R. Cooper; Wade James Brady, III; Frederick J. Telecky, Jr.

(57) ABSTRACT

An electrostatic discharge (ESD) protection circuit includes a control circuit configured to generate a signal indicating whether an input voltage on an input/output pad is excessive. The protection circuit also includes a voltage divider configured to receive the signal from the control circuit and to divide the input voltage to produce a divided voltage. The protection circuit further includes an inverter chain having multiple inverters, where a first inverter is configured to receive the divided voltage and at least two inverters are configured to generate transistor control signals. In addition, the protection circuit includes a plurality of transistors configured to receive the transistor control signals and, when the input voltage is excessive, to prevent the input voltage from being provided to a protected circuit.

12 Claims, 2 Drawing Sheets

U.S. PATENT DOCUMENTS

| | | | |
|---|---|---|---|
| 7,238,553 B1 | 7/2007 | Vashchenko et al. | |
| 7,268,398 B1 | 9/2007 | Vashchenko et al. | |
| 7,285,805 B1 | 10/2007 | Vashchenko et al. | |
| 7,298,599 B1 | 11/2007 | Vashchenko et al. | |
| 7,379,283 B1 | 5/2008 | Farrenkopf et al. | |
| 7,387,918 B1 | 6/2008 | Vashchenko et al. | |
| 7,394,133 B1 | 7/2008 | Vashchenko et al. | |
| 7,411,251 B1 | 8/2008 | Vashchenko | |
| 7,422,952 B1 | 9/2008 | Vashchenko et al. | |
| 7,521,310 B1 | 4/2009 | Vashchenko et al. | |
| 2002/0079540 A1 | 6/2002 | Vashchenko et al. | |
| 2002/0097082 A1 | 7/2002 | Vashchenko et al. | |
| 2002/0097544 A1 | 7/2002 | Vashchenko et al. | |
| 2008/0285199 A1* | 11/2008 | Deutschmann et al. | 361/111 |
| 2009/0032814 A1 | 2/2009 | Vashchenko et al. | |
| 2009/0162978 A1 | 6/2009 | Vashchenko et al. | |
| 2009/0268359 A1* | 10/2009 | Chatty et al. | 361/56 |

OTHER PUBLICATIONS

Markus P.J. Mergens, et al, "Diode-Triggered SCR (DTSCR) for RF-ESD Protection of BiCMOS SiGe HBTs and CMOS Ultra-Thin Gate Oxides", 2003 IEEE, 4 pages.

Christian C. Russ, et al., "GGSCRs: GGNMOS Triggered Silicon Controlled Rectifiers for ESD Protection in Deep Sub-Micron CMOS Processes", 2001, 10 pages.

V.A. Vashchenko, et al., "Mixed Device-Circuit Solution for ESD Protection of High-Voltage Fast Pins", 2007 IEEE, 45TH Annual International Reliability Physics Symposium, Phoenix, p. 602-603.

Pee-Ya Tan, et al., "RC-Triggered PNP and NPN Simultaneously Switched Silicon Controlled Rectifier ESD Networks for Sub-0.18 μm Technology", Proceedings of 12th IPFA 2005, Singapore, p. 71-75.

Alex Gerdemann, et al., "A Kelvin Transmission Line Pulsing System with Optimized Oscilloscope Ranging", EOS/ESD Symposium 07-80, 9 pages, 2007.

James Di Sarro, et al., "Evaluation of SCR-Based ESD Protection Devices in 90NM and 65NM CMOS Technologies", IEEE 45th Annual International Reliability Physics Symposium, Phoenix, 2007, p. 348-357.

D. Linten et al., "Extreme Voltage and Current Overshoots in HV Snapback Devices during HBM ESD stress", EOS/ESD Symposium 2008, 7 pages.

V.A. Vashchenko et al., "Bipolar SCR ESD devices", Microelectronics Reliability 45 (2005), p. 457-471.

James Di Sarro, et al., "Study of Design Factors Affecting Turn-On Time of Silicon Controlled Rectifiers (SCRs) in 90 and 65NM Bulk CMOS Technologies", 2006 IEEE 44TH Annual International Reliability Physics Symposium, San Jose, p. 163-168.

V. Vashchenko, et al., "Comparison of ESD Protection Capability of Lateral BJT, SCR and bi-directional SCR for Hi-Voltage BiCMOS Circuits", 2002 IEEE, p. 181-184.

V.A. Vashchenko, et al., "Bipolar SCR ESD Protection in a 0.25 μm Si-Ge Process Using Sub-Collector Region Modification", 2004 IEEE 42nd Annual International Reliability Physics Symposium, Phoenix, p. 469-473.

V.A. Vashchenko, et al., "Implementation of Dual-Direction SCR Devices in Analog CMOS Process", EOS/ESD Symposium 07-75, 5 pages, 2007.

V.A. Vashchenko, et al., "High Performance SCR's for On-Chip ESD Protection in High Voltage BCD Processes", 2003 IEEE, ISPSD 2003, Apr. 14-17, Cambridge, UK, p. 261-264.

V.A. Vashchenko, et al., "A new Principle for a Self-Protecting Power Transistor Array Design", Proceedings of the 18th International Symposium on Power Semiconductor Devices & IC's, Jun. 4-8, 2006, Naples, Italy, 4 pages.

V.A. Vashchenko, et al., "Self-Protecting Arrays for Open Drain Circuits", 2006 IEEE 44th Annual International Reliability Physics Symposium, San Jose, p. 637-638.

V.A. Vashchenko, et al., "Turn-On Voltage Control in BSCR and LDMOS-SCR by the Local Blocking Junction Connection", 2006 IEEE, 4 pages.

V.A. Vashchenko, et al., "BSCR ESD Protection in 250V Process Taking into Account the Turn-Off Effect", 2005 IEEE, p. 70-73.

Ann Concannon, et al., "ESD Protection of Double-Diffusion Devices in Submicron CMOS Processes", 2004 IEEE, p. 261-264.

V.A. Vashchenko, et al., "Stacked BSCR ESD Protection for 250V Tolerant Circuits", Proceedings of 2004 International Symposium on Power Semiconductor Devices & ICs, Kitakyushu, p. 225-228.

V.A. Vashchenko, et al., "Dual-direction Isolated NMOS-SCR Device for System Level ESD Protection", 2006 ESDA, 5 pages.

V.A. Vashchenko, et al., "Active Control of the Triggering Characteristics of NPN BJT, BSCR and NLDMOS-SCR Devices", Proceedings of the 19th International Symposium on Power Semiconductor Devices & ICs May 27-30, 2007, Jeju, Korea, p. 41-44.

V.A. Vashchenko, et al., "Implementation of High VT Turn-on in Low-Voltage SCR Devices", 6 pages, 2005.

V.A. Vashchenko, et al., "Lateral PNP BJT ESD Protection Devices", 2008 IEEE, p. 53-56.

* cited by examiner

ELECTROSTATIC DISCHARGE (ESD) PROTECTION CIRCUIT AND RELATED APPARATUS AND METHOD

TECHNICAL FIELD

This disclosure is generally directed to integrated circuits. More specifically, this disclosure is directed to an electrostatic discharge (ESD) protection circuit and related apparatus and method.

BACKGROUND

Electrostatic discharge (ESD) protection circuits are routinely used to protect integrated circuits from damage caused by electrostatic discharge. However, local ESD protection is a major challenge for low-voltage integrated circuits. For example, complimentary metal oxide semiconductor (CMOS) technologies are becoming smaller and smaller, such as when implemented using 0.13 µm or 65 nm CMOS processes. These process technologies are typically associated with corresponding reductions in transistor gate oxide thickness. Gate oxides with reduced thickness are more sensitive to voltage overstress.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
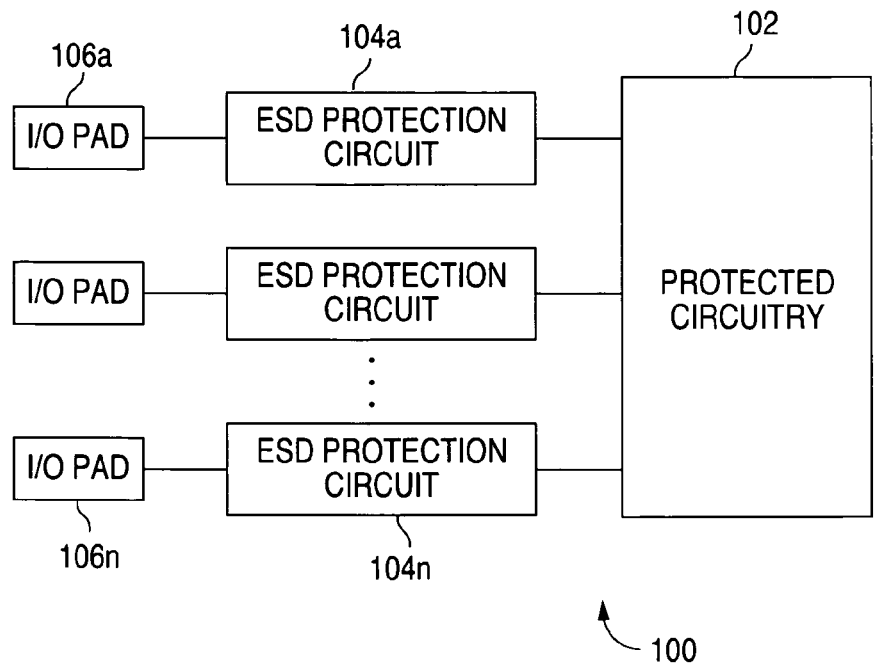
FIG. 1 illustrates an example integrated circuit with electrostatic discharge protection according to this disclosure.
Figure 2:
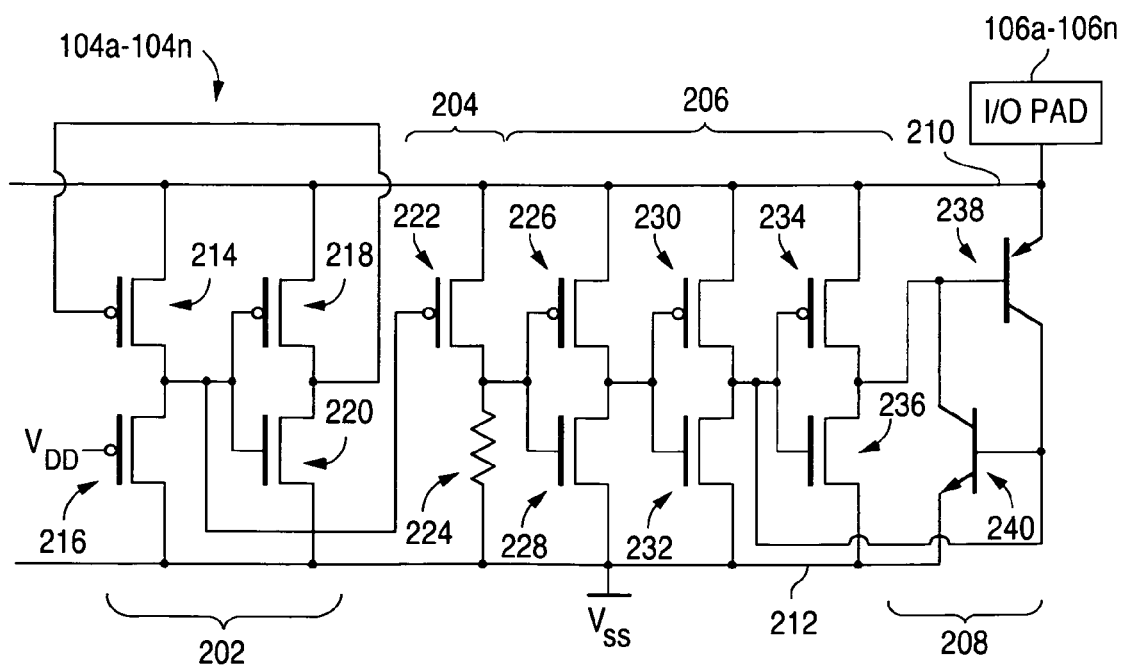
FIG. 2 illustrates an example electrostatic discharge protection circuit according to this disclosure.
Figure 3:
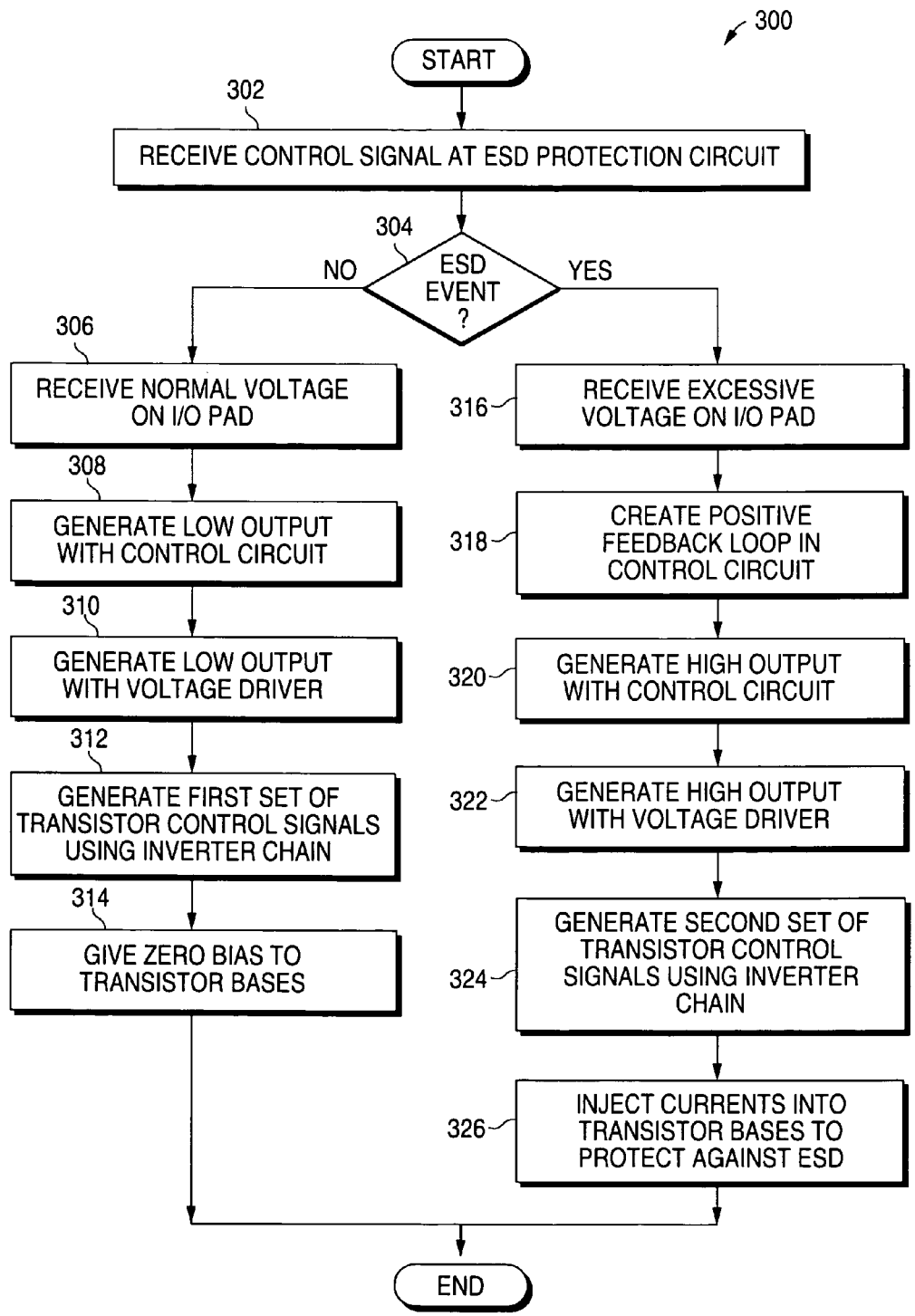
FIG. 3 illustrates an example method for electrostatic discharge protection according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example integrated circuit 100 with electrostatic discharge (ESD) protection according to this disclosure. The embodiment of the integrated circuit 100 shown in FIG. 1 is for illustration only. Other embodiments of the integrated circuit 100 could be used without departing from the scope of this disclosure.

As shown in FIG. 1, the integrated circuit 100 includes protected circuitry 102, multiple ESD protection circuits 104a-104n, and multiple input/output (I/O) pads 106a-106n. The protected circuitry 102 generally represents any integrated circuit chip or other circuitry having one or more I/O pins or other structures requiring ESD protection. For example, the protected circuitry 102 could represent integrated circuitry produced using a low-voltage complimentary metal oxide semiconductor (CMOS) process, such as a 0.13 µm or 65 nm CMOS process.

The ESD protection circuits 104a-104n are coupled to I/O pins or other structures of the protected circuitry 102. Each of the ESD protection circuits 104a-104n provides ESD protection for the protected circuitry 102, such as by limiting or preventing excessive voltages from reaching the protected circuitry 102. As described in more detail below, each of the ESD protection circuits 104a-104n could include a dual-base triggered silicon controlled rectifier (SCR) structure. This structure could simultaneously provide a low triggering voltage and a high-breakdown and low-leakage ESD clamp in a highly compact area. One example embodiment of the ESD protection circuits 104a-104n is shown in FIG. 2.

The I/O pads 106a-106n are coupled to the ESD protection circuits 104a-104n. The I/O pads 106a-106n represent square pads or other structures on which wires or other electrical connections can be placed. The I/O pads 106a-106n provide electrical connection to the protected circuitry 102, allowing external components to send electrical signals to or receive electrical signals from the protected circuitry 102. Each of the I/O pads 106a-106n represents any suitable structure configured to be coupled to a wire or other electrical connection.

Although FIG. 1 illustrates an example integrated circuit 100 with ESD protection, various changes may be made to FIG. 1. For example, the integrated circuit 100 could include any number of protected circuits, ESD protection circuits, and I/O pads.

FIG. 2 illustrates an example ESD circuit 104a-104n according to this disclosure. The embodiment of the ESD circuit 104a-104n shown in FIG. 2 is for illustration only. Other embodiments of the ESD circuit 104a-104n could be used without departing from the scope of this disclosure.

As shown in FIG. 2, the ESD circuit 104a-104n includes four general components: a control circuit 202, a voltage divider 204, an inverter chain 206, and a transistor section 208. These components are coupled to and between two rails 210-212.

In this example embodiment, the control circuit 202 includes four transistors 214-220. The transistors 214 and 218 represent p-channel MOS (PMOS) transistors, and the transistors 216 and 220 represent n-channel MOS (NMOS) transistors. A source of the transistor 214 is coupled to the rail 210, and a source of the transistor 216 is coupled to the rail 212. Drains of the transistors 214-216 are coupled together and to gates of the transistors 218-220. A source of the transistor 218 is coupled to the rail 210, and a source of the transistor 220 is coupled to the rail 212. Drains of the transistors 218-220 are coupled together and to a gate of the transistor 214. A gate of the transistor 216 can receive a supply voltage $V_{DD}$ when a protected circuit is powered on, or the gate of the transistor 216 could float when the protected circuit is powered off.

The voltage divider 204 in this example embodiment is implemented using a transistor 222 and a resistor 224. The transistor 222 represents an NMOS transistor having a drain coupled to the rail 210, a source coupled to the resistor 224, and a gate. The gate is configured to receive a voltage formed between the transistors 214-216 in the control circuit 202. The resistor 224 is coupled between the transistor 222 and the rail 212 and could have any suitable resistance.

The inverter chain 206 in this example embodiment includes three inverters. The first inverter is formed by transistors 226-228, the second inverter is formed by transistors 230-232, and the third inverter is formed by transistors 234-236. The transistors 226, 230, and 234 represent PMOS transistors, and the transistors 228, 232, and 236 represent NMOS transistors. The transistors 226-228 have gates configured to receive a voltage produced between the transistor 222 and the resistor 224 in the voltage divider 204. The transistors 230-232 have gates configured to receive a voltage produced between the transistors 226-228. The transistors 234-236 have gates configured to receive a voltage produced between the transistors 230-232.

In this example embodiment, the transistor section 208 includes two bipolar junction transistors 238-240 arranged to form a silicon controlled rectifier (SCR). The transistor 238 represents a PNP transistor, and the transistor 240 represents an NPN transistor. The transistor 238 has an emitter coupled to the rail 210 and an I/O pad, a base coupled to an output of the third inverter in the inverter chain 206, and a collector coupled to an output of the second inverter in the inverter chain 206. The transistor 240 has a collector coupled to an output of the third inverter in the inverter chain 206 and to the base of the transistor 238. The transistor 240 also has a base coupled to an output of the second inverter in the inverter chain 206 and to the collector of the transistor 238. The transistor 240 further has an emitter coupled to the rail 212.

During normal operation with no ESD event, an integrated circuit chip or other circuitry being protected (such as circuitry 102) is powered, and the voltage $V_{DD}$ is high. The high $V_{DD}$ voltage causes the transistor 216 to pull its drain to $V_{SS}$, and the voltage produced between the transistors 214-216 is low. This causes the voltage produced between the transistor 222 and the resistor 224 to be low. The second inverter therefore outputs a low voltage that pulls the p-well of the transistor 240 to $V_{SS}$, while the third inverter outputs a high voltage that pulls the n-well of the transistor 238 to the voltage on the I/O pad. In this condition, both base-emitter junctions of the transistors 238-240 can have zero or near-zero bias, so leakage current can be very small. The voltage on the I/O pad is therefore supplied to the protected circuit.

During an ESD condition when an integrated circuit chip or other circuitry being protected is not powered, the voltage $V_{DD}$ is floating. In this case, the transistors 214 and 218 pull up their drains, but the transistor 214 can be sized larger so that it pulls up its drain faster and turns on the transistor 220 (forming a positive feedback loop). The voltage at the gate of the transistor 222 is then pulled up to the voltage on the I/O pad. Once the voltage at the interior of the voltage divider 204 reaches the switching threshold of the first inverter, the first inverter outputs a low voltage. The second inverter therefore outputs a high voltage that pulls up the p-well of the transistor 240, while the third inverter outputs a low voltage that pulls down the n-well of the transistor 238. In this condition, current is injected into both bases of the transistors 238-240 simultaneously, triggering silicon controlled rectification. As a result, the ESD protection circuit prevents most or all of the excessive voltage on the I/O pad from reaching the protected circuit.

In particular embodiments, the components shown in FIG. 2 are produced using a low-voltage CMOS process, such as the OPTIMOS, OPTIMOS2, or CBC8 process of NATIONAL SEMICONDUCTOR CORPORATION or any suitable CMOS or BiCMOS process. A particular design of the protection circuit could be implemented in 0.13 μm BiCMOS technology with a core $V_{DD}$ of 1.2V, an I/O voltage of 2.5V, and a width of 50 μm intended to protect a 2.5V I/O pad from triggering voltages above 2.5V when not powered.

Depending on the implementation, the ESD protection circuit 104a-104n shown in FIG. 2 could offer the following benefits. The ESD protection circuit 104a-104n could have a variable triggering voltage, such as a 2-3V triggering voltage when $V_{DD}$ is floating and a higher triggering voltage when $V_{DD}$ is high. This means that the $V_{DD}$ line can be used as a control signal to increase the triggering voltage when the protected circuit is powered, which can help to prevent inadvertent triggering of the transistors 238-240. The ESD protection circuit 104a-104n could also have very low leakage when in the off (non-triggered) state. For example, the protection circuit could have a relatively flat leakage over its normal operating temperature range, such as a leakage of 0.2 nA/μm at 2.5V. In fact, since the leakage of the protection circuit can be decoupled from its triggering voltage, it is possible for the protection circuit to have both low leakage and a low triggering voltage (unlike conventional diode-triggered silicon controlled rectifiers). The ESD protection circuit 104a-104n could further provide a very fast response to an ESD event. For instance, the time required for the components 202-204 to produce a high enough voltage for the inverter section 206 to trigger rectification could be 10-50 ns. In addition, the protection circuit could have low parasitic features while simultaneously having a low triggering voltage, making the protection circuit useful in low-voltage CMOS applications.

Among the various design considerations of the protection circuit, the width/resistance of the transistor 222 and the resistance of the resistor 224 can affect the triggering voltage, but in particular embodiments the exact relationship may be somewhat complicated by several conflicting effects within the protection circuit. As a result, circuit simulations can be used to design the voltage divider 204 for a target triggering voltage (such as to select a width of the transistor 222 and/or a resistance of the resistor 224).

As another design consideration, the triggering voltage may be independent of rise time during an ESD condition, but a dV/dt effect can exist when the protected circuit is powered. The magnitude of the dV/dt effect may depend on the transistor sizing ratios (PMOS/NMOS) of the second and third inverters in the inverter chain 206, where large inverter sizing ratios can lead to an increased dV/dt effect. The dV/dt effect can therefore be mitigated with a proper design of the inverter sizing ratios in the inverter chain 206.

Although FIG. 2 illustrates an example ESD circuit 104a-104n, various changes may be made to FIG. 2. For example, each of the components 202-208 in FIG. 2 could be implemented using any suitable sub-components. As particular examples, the inverter stage 206 could be implemented using any suitable number of inverters, and the transistor stage 208 could include any suitable transistors.

FIG. 3 illustrates an example method 300 for electrostatic discharge protection according to this disclosure. The embodiment of the method 300 shown in FIG. 3 is for illustration only. Other embodiments of the method 300 could be used without departing from the scope of this disclosure. Also, for ease of explanation, the method 300 is described with respect to the ESD protection circuit 104a-104n of FIG. 2 operating in the circuit 100 of FIG. 1. The method 300 could be used by or in any other suitable device or system.

A control signal is received at step 302. This could include, for example, the ESD protection circuit 104a-104n receiving a $V_{DD}$ signal that is either high or floating. An ESD event may or may not occur at step 304. If one does not occur, a normal voltage can be received at an I/O pad at step 306. This could include, for example, receiving a voltage between 0-2.5V on an I/O pad 106a-106n. A low output is generated by a control circuit at step 308. This could include, for example, the control circuit 202 outputting a low voltage in response to the normal voltage on the I/O pad. The low output of the control circuit causes a voltage divider to generate a low output at step 310. A first set of transistor control signals is generated by an inverter chain using the output of the voltage divider at step 312. This could include, for example, the second inverter in the inverter chain 206 outputting a low voltage and the third inverter in the inverter chain 206 outputting a high voltage.

These control signals are used to provide zero (or substantially zero) bias to transistor bases at step 314. In this way, the transistors 238-240 have very low leakage and do not interfere with the protected circuit (such as circuitry 102) receiving the normal voltage on the I/O pad.

If an ESD event does occur at step 304, the ESD protection circuit receives an excessive voltage on an I/O pad at step 316. This could include, for example, the I/O pad 106a-106n receiving a voltage greater than 2.5V when $V_{DD}$ is floating. This creates a positive feedback loop in the control circuit at step 318. For instance, this may include the transistors 214 and 218 pulling up their drains, where the transistor 214 pulls its drain up faster and turns on the transistor 220 to form a positive feedback loop. A high output is generated by the control circuit at step 320, and a high output is generated by the voltage divider at step 322. Eventually, the high output of the voltage divider passes the threshold of the inverters in the inverter chain, and a second set of transistor control signals is generated at step 324. This could include, for example, the second inverter in the inverter chain 206 outputting a high voltage and the third inverter in the inverter chain 206 outputting a low voltage. These control signals are used to inject current onto the transistor bases at step 326. In this way, the transistors 238-240 protect the protected circuit against the excessive voltage associated with the ESD event. This may continue until the voltage on the I/O pad returns to normal or is no longer representative of an ESD event.

Although FIG. 3 illustrates an example method 300 for electrostatic discharge protection, various changes may be made to FIG. 3. For example, while shown as a series of steps, various steps in FIG. 3 could overlap, occur in parallel, occur multiple times, or occur in a different order.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

The invention claimed is:

1. An electrostatic discharge (ESD) protection circuit comprising:
   a control circuit configured to generate a signal indicating whether an input voltage on an input/output pad is excessive;
   a voltage divider configured to receive the signal from the control circuit and to divide the input voltage to generate a divided voltage;
   an inverter chain comprising multiple inverters, a first inverter configured to receive the divided voltage, at least two inverters configured to generate transistor control signals; and
   a plurality of transistors configured to receive the transistor control signals and, when the input voltage is excessive, to protect a protected circuit from the excessive input voltage;
   wherein the control circuit comprises:
      first and second transistors coupled in series; and
      third and fourth transistors coupled in series;
      wherein a gate of the first transistor is coupled to receive a voltage generated between the third and fourth transistors;
      wherein gates of the third and fourth transistors are coupled to receive a voltage generated between the first and second transistors; and
      wherein a gate of the second transistor is configured to receive a supply voltage.

2. The electrostatic discharge (ESD) protection circuit of claim 1, further comprising:
   the control circuit further configured to receive an input voltage on an input/output pad and generate a signal indicating whether the input voltage on the input/output pad is excessive.

3. The ESD protection circuit of claim 2, wherein the voltage divider comprises a transistor configured to receive the input voltage and a resistor coupled in series with the transistor, a gate of the transistor configured to receive the signal from the control circuit.

4. The ESD protection circuit of claim 3, wherein the transistor comprises an NMOS transistor.

5. The ESD protection circuit of claim 2, wherein the inverter chain comprises the first inverter, a second inverter, and a third inverter coupled in series, the second and third inverters configured to generate the transistor control signals.

6. The ESD protection circuit of claim 5, wherein the plurality of transistors comprises:
   a first bipolar junction transistor having an emitter configured to receive the input voltage, a base configured to receive the transistor control signal from the third inverter, and a collector coupled to an output of the second inverter; and
   a second bipolar junction transistor having a collector coupled to an output of the third inverter and to the base of the first bipolar junction transistor, a base configured to receive the transistor control signal from the second inverter and coupled to the collector of the first bipolar junction transistor, and an emitter.

7. The ESD protection circuit of claim 6, wherein the first bipolar junction transistor comprises a PNP transistor, and the second bipolar junction transistor comprises an NPN transistor.

8. The ESD protection circuit of claim 1, wherein the first and third transistors comprise PMOS transistors, and the second and fourth transistors comprise NMOS transistors.

9. An apparatus comprising:
   integrated circuitry to be protected;
   an input/output pad in electrical connection with the integrated circuitry; and
   an electrostatic discharge (ESD) protection circuit coupled to the integrated circuitry and the input/output pad, wherein the ESD protection circuit comprises:
      a control circuit configured to generate a signal indicating whether an input voltage on the input/output pad is excessive;

a voltage divider configured to receive the signal from the control circuit and to divide the input voltage to generate a divided voltage;

an inverter chain comprising multiple inverters, a first inverter configured to receive the divided voltage, at least two inverters configured to generate transistor control signals; and a plurality of transistors configured to receive the transistor control signals and, when the input voltage is excessive, to protect the integrated circuitry from the excessive input voltage; and wherein the control circuit comprises:

first and second transistors coupled in series; and third and fourth transistors coupled in series;

wherein a gate of the first transistor is coupled to receive a voltage generated between the third and fourth transistors;

wherein gates of the third and fourth transistors are coupled to receive a voltage generated between the first and second transistors; and wherein a gate of the second transistor is configured to receive a supply voltage.

10. The apparatus of claim 9, wherein the inverter chain comprises the first inverter, a second inverter, and a third inverter coupled in series, the second and third inverters configured to generate the transistor control signals.

11. The apparatus of claim 10, wherein the plurality of transistors comprises:

a first bipolar junction transistor having an emitter configured to receive the input voltage, a base configured to receive the transistor control signal from the third inverter, and a collector coupled to an output of the second inverter; and a second bipolar junction transistor having a collector coupled to an output of the third inverter and to the base of the first bipolar junction transistor, a base configured to receive the transistor control signal from the second inverter and coupled to the collector of the first bipolar junction transistor, and an emitter.

12. The apparatus of claim 9, wherein:

the input/output pad comprises one of multiple input/output pads; and the ESD protection circuit comprises one of multiple ESD protection circuits, each ESD protection circuit coupled to one of the input/output pads.

\* \* \* \* \*